United States Patent
Bauer

[11] 3,920,253
[45] Nov. 18, 1975

[54] NON-LEAKING GAS SPRING
[76] Inventor: Fritz Bauer, Schulzstr. 14, 8503 Altdorf near Nuremberg, Germany
[22] Filed: Dec. 2, 1974
[21] Appl. No.: 528,689

[52] U.S. Cl. .............................. 277/187; 188/313
[51] Int. Cl.² .......................................... F16J 15/18
[58] Field of Search .......... 277/187, 188, 189, 213; 188/313, 317

[56] References Cited
UNITED STATES PATENTS

| | | | |
|---|---|---|---|
| 2,356,947 | 8/1944 | Pranger et al. | 277/213 |
| 2,401,960 | 6/1946 | Pranger | 277/213 |
| 3,040,841 | 6/1962 | Schultze | 188/313 |
| 3,176,802 | 4/1965 | Zeidler | 188/313 |
| 3,186,724 | 6/1965 | Wheatley | 277/187 |
| 3,334,549 | 8/1967 | Sheldon | 277/188 |
| 3,407,909 | 10/1968 | Seckerson et al. | 188/313 |

Primary Examiner—Robert I. Smith
Attorney, Agent, or Firm—Browdy and Neimark

[57] ABSTRACT

A non-leaking gas spring comprises two grooves in the internal wall of the housing at a preset distance, with a ring in a corresponding annular recess in the guide element and the holding element, with at least the ring associated with the holding element in the form of a snap ring.

7 Claims, 4 Drawing Figures 3,920,253

NON-LEAKING GAS SPRING

FIELD OF THE INVENTION

The invention relates to gas springs, and, more particularly, to gas springs consisting essentially of a housing formed by a slender cylindrical tube and a piston rod mounted coaxially in said housing, supporting a guide piston and protruding from one end of the housing, the piston rod acting as a compressing cylinder, with a multiple lip seal being fastened axially in the housing at the end of the housing from which the piston rod emerges, the seal resting against the piston rod, with a fastening element being attached to the internal end face and a guide element being attached to the external end face of the seal.

BACKGROUND OF THE INVENTION

In known gas springs of this type, filled with gas to a pressure of 200 atu, the holding element is fastened axially by a seam rolled externally into the housing wall, while the guide element is fastened axially by a flanging of the edge of the housing or an end plate welded into place. In practice, it has been found that in individual cases these gas springs lose gas following prolonged operation, i.e., their spring characteristics deteriorate.

It has now been discovered that the rolling of seams into the housing wall, i.e., the plastic deformation of the housing of the gas spring and the flanging of the thick-walled housing as carried out in the past, distorts the housing itself so that absolute coaxial guidance of the piston rod in the housing and hence in the seal, cannot be ensured. The rolling of seams into the housing thus means that the guide element and the seal are unevenly stressed radially, due to the bending moments acting on the piston rod, and therefore the housing eventually develops leaks.

The flanging of the edge against the guide element simultaneously causes the seal to be compressed axially and therefore to be prestressed radially. Since the guide element itself, which serves as a support during the flanging of the edge, is in turn supported elastically against the seal, there is an irregular prestressing of the seal for different gas springs, so that here again it is impossible to achieve a uniform sealing condition.

SUMMARY OF THE INVENTION

Hence, objects of the invention are to overcome the defects of the prior art as indicated above, to provide improved gas springs and to modify a gas spring of the type described above in such a fashion that the danger of the gas spring leaking during operation is reduced, with simultaneous simplification of manufacture and assembly.

These objects are achieved according to the invention by providing two grooves in the internal wall of the housing at a preset distance, with a ring fitting into a corresponding annular recess in the guide element and the holding element, with at least the ring associated with the holding element being made in the form of a snap ring.

The present invention, based on the discovery of the causes of leakage, solves both groups of problems noted above, namely, on the one hand there is no longer any plastic deformation of the housing in the vicinity of the holding element, and on the other hand, there is an absolutely exactly definable distance between the holding element and the guide element, so that the seal is uniformly prestressed in all gas springs. The two causes for the gas spring developing leaks, known according to the present invention, are therefore eliminated by a single solution. The solution according to the invention is therefore particularly advantageous in its application when the seal also provides a sealing function against the internal wall of the housing, in other words is bilaterally sealing, so that no additional sealing elements are required on the guide element and/or on the holding element with respect to the internal wall of the housing.

The seal advantageously consists of a homogeneous material and is therefore not provided with steel snap rings or the like. Since only the seal is provided in the cylinder ring space between the guide element and the holding element, the sealing volume and hence the sealing effect are optimal. If, according to a particularly advantageous embodiment of the invention, the ring associated with the guide element is also made in the form of a snap ring, it is of further advantage for the groove associated with the guide element to be tapered in the direction of the internal space of the housing, since this considerably facilitates assembly as the snap ring associated with the holding element is inserted and is pushed back again into the recess in the holding element by further advancing the holding element over this tapered surface, i.e., the holding element with the snap ring can be pushed past this annular groove.

In addition, the insertion of the holding element with its snap ring and the seal and the guiding element with its snap ring is facilitated if, at the end from which the piston rod emerges, the housing is provided with a taper in the internal wall which increases up to the edge of the housing. Neat closure of the housing is achieved at the end from which the piston rod emerges by having the guide element overlap the end face edge of the housing.

This embodiment, in which no further working processes are required even after assembly of the piston rod with the guide piston and the seal with fastening element and guide element, has the great advantage that the housing can be completely painted, enameled or chromed before these parts are installed, without such paint or chrome being damaged later by subsequent manufacturing processes, for example flanging of the edge of the housing. This considerably simplifies manufacture, since otherwise at least the end of the piston rod protruding from the housing would have to be carefully covered. In addition, stove-enamelling for the pre-enameled housing can be dried at a temperature which would damage the seal or the holding element, made of plastic, in a previously completely assembled gas spring.

Another sample embodiment which is equivalent with respect to its sealing characteristics, but not quite so advantageous as far as its manufacturing cost is concerned, is characterized by the fact that the recess in the guide element and the associated groove extend up to the end face of the housing, by the fact that the associated ring is itself rigid, and by the fact that the outer edge area of the housing is flanged over this ring. This ring, whose axial position is precisely determined, serves as a support for the flanging of the housing edge, so that no deformation of the housing can occur because of the reduction of the wall thickness of the housing and no differential axial compression of the seal and the guide element can occur. It should also be pointed out that the flanging at the other, completely closed end of the housing is not so harmful, since the deformations of the housing caused by a forming element extend only over a short distance. Since the piston rod is guided at one end by the guide element and at the other end by the guide piston, when the housing is deformed in the vicinity of its closed end, with the piston rod all the way into the housing, the latter will be bent only at a very much smaller angle relative to the housing axis than if such deformation took place in the vicinity of the housing seal.

BRIEF DESCRIPTION OF THE DRAWING

Further advantages and features of the invention will be seen from the description of sample embodiments in the drawing.

DETAILED DESCRIPTION OF ILLUSTRATED EMBODIMENTS

Figure 1:
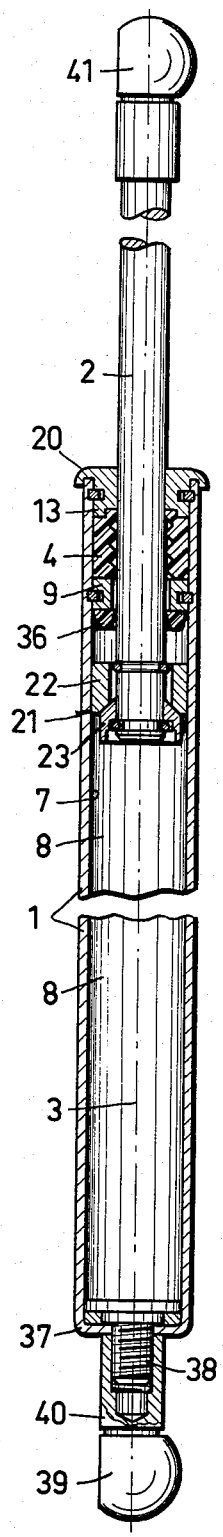
FIG. 1: a gas spring according to the invention, in cross-section.

The gas springs shown in the drawing consist essentially of a tubular or cylindrical housing 1, which is long with respect to its diameter, and is therefore slender; the housing is preferably made of a drawn steel tube. A piston rod 2, acting as a compressing piston, is mounted coaxially in housing 1, the piston rod also having a cylindrical cross section. The axis of the piston rod therefore coincides with the axis 3 of housing 1. The housing is sealed by means of a known multiple-lip seal 4 at the end (at the top of the drawing) from which the piston rod emerges from housing 1; the seal 4 has its lips 5 resting against the absolutely smooth surface of piston rod 2. The outer circumference 6 of lip seal 4 also effects a seal against the internal wall 7 of the housing 1, so that an absolutely tight closure of the housing 1 at the end from which the piston rod 2 emerges is achieved by this seal, which is of homogeneous construction and is therefore not protected.

At its end face, which rests against the internal chamber 8 of housing 1, the lip seal 4, whose length is approximately equal to its outside diameter, is fastened axially in place within the housing 1 by means of a cylindrical annular holding element 9. The diameter of the bore 9' of the fastening element is somewhat larger than the diameter of piston rod 2, so that the rod 2 does not contact and is not guided in the fastening element 9. The fastening element 9 has a radially recessed annular groove shaped depression 10 on its outside circumference which is in contact with internal wall 7 of the housing 1; a snap ring 11, i.e., an elastically deformable ring, is associated with and rests within the depression 10. The internal wall 7 of the housing 1 is provided with a corresponding annular groove, likewise recessed radially, into which snap ring 11 also fits.

The axial lengths of recess 10 and annular groove 12 are the same and of such size that snap ring 11 has practically no axial play when located within the recess 10 and the annular groove 12, so that the fastening element 9 is held in housing 1 with no axial play. The radial depth of annular recess 10 is at least as great as the radial width of snap ring 11, so that the snap ring can elastically deform and retreat completely into the recess 10 when the fastening element 9 is shoved into housing 1; then, when the recess 10 and the annular groove 12 line up radially, the ring 11 snaps into the annular groove 12 under elastic expansion, thus producing a permanent connection between the fastening element 9 and the housing 1 at this point.

Figure 2:
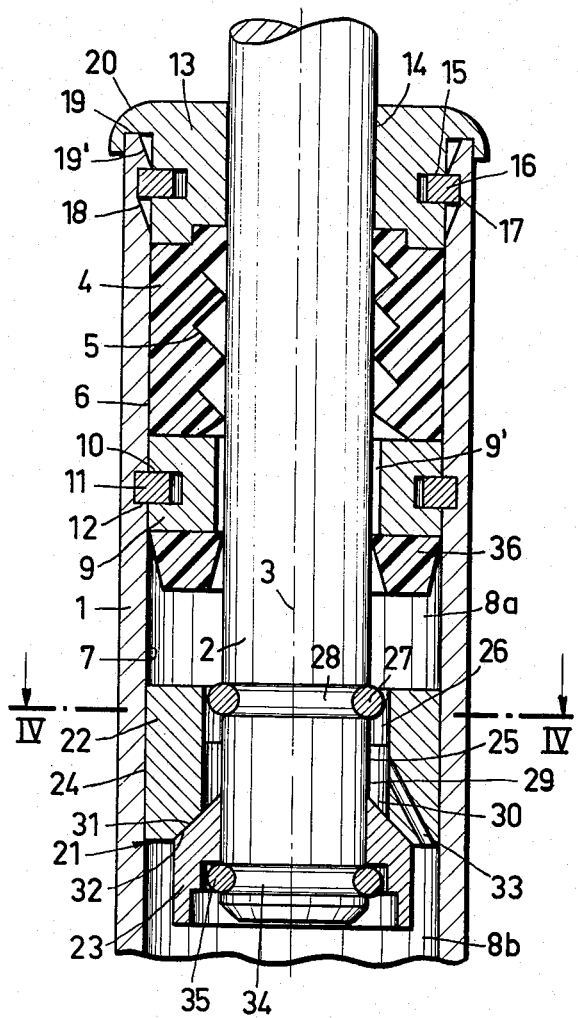
FIG. 2: an enlarged view of the seal area of the gas spring according to FIG. 1.
Figure 4:
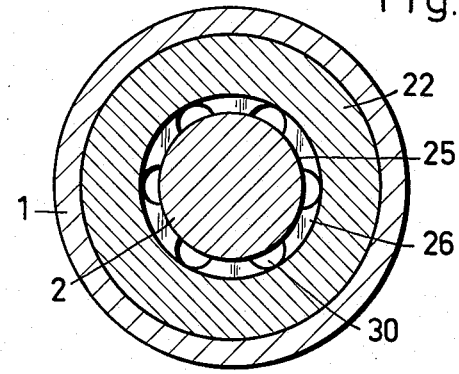
FIG. 4: a cross-section along section line IV—IV in FIG. 2.

In the illustrative embodiment shown in FIGS. 1 and 2, the seal 4 is fastened axially at its outer end face by a similar, somewhat cylindrical annular guide element 13. This guide element 13 has its internal bore 14 fitting tightly against piston rod 2, so that piston rod 2 is guided radially in the guide element 13, and so that no contamination can enter the seal 4 from the outside. The guide element 13 is made preferably of a thermoplastic, i.e., elastic plastic, with good sliding characteristics with respect to steel, e.g., a polyolefin or PTFE or the like.

The guide element 13 is mounted axially in the housing in theoretically the same fashion as the fastening element 10. An annular recess 15 is provided on the cylindrical outer circumference of the guide element 13, the radial depth of such recess 15 being at least equal to the annular width of a snap ring 16 associated with this recess, the snap ring 16 being likewise practically free of axial play in the recess. The snap ring 16 fits into an annular groove 17 in the internal wall 7 of the housing. This annular groove 17 is different from the annular groove 12 by the fact that its side wall, resting against internal chamber 8 of the housing 1, is tapered outwardly from the bottom of the annular groove in the form of a truncated cone, so that a tapered surface 18 is formed to facilitate assembly of the device.

The internal wall 7 of the housing 1 has a similar taper 19' at its edge 19, which taper expands toward such edge also to facilitate assembly. The housing 1 is not plastically deformed in the entire area of the seal or over its length, i.e., it has a cylindrical outside surface which is completely rectilinear. The guide element 13 is formed in such fashion that it covers the edge 19 of the housing 1 with a shoulder 20, so that a clean and smooth closure of the gas spring is effected at this end.

The axial spacing of fastening element 9 and guide element 13 is such that the seal 4 is compressed axially to a desired degree, so that it is pressed radially by virtue of its elastic properties with a desired preset tension, on the one hand against the internal wall 7 of the housing 1 and on the other hand with its lips 5 against piston rod 2. The seal 4 consists of an elastic material, preferably polyurethane known by the registered trademark of "Vulkollan".

At the free end face of the fastening element 9, an annular shock absorber 36 made of rubber is provided, which prevents a hard impact of a sliding piston 22 against the fastening element 9 when the piston rod travels outwardly from the housing 1.

A guide piston 21 is mounted on the inner end of piston rod 2, such piston 21 consisting primarily of the sliding piston 22 and a valve housing 23. The sliding piston 22 is made in a cylindrically annular shape and rests with its outer surface 24 against the internal wall 7 of the housing 1 with a small amount of play. Its internal bore 25 is coaxial with the piston rod, which it likewise accepts with a slight amount of play. On its side facing the seal 4 and the chamber 8a, the bore 25 has an increased bore section 26, whose diameter is sufficiently large to accept a retaining ring 27, which fits into a corresponding annular groove 28 on the piston rod 2. In the bore section 29 of the internal bore 25 which rests against the piston rod 2, several axially parallel passages 30 are provided, which terminate in the expanded section 26 of the bore.

At the end of the sliding piston 22 which terminates in the internal chamber 8b of the housing 1, an expansion in the shape of a truncated cone is provided which serves as a valve seat 31, against which the valve housing 23 can rest with an appropriate valve seat surface 32. When the valve housing 23 and the sliding piston 22 with its valve seat surfaces 31 and 32 are in contact, the passages 30 are closed. In addition, an additional diagonal damping bore 33 is provided in the sliding piston 22, which is not closed by valve housing 23, and therefore permanently links the chambers 8a and 8b, in the housing 1, which are on both sides of guide piston 21.

The valve housing 23 is fastened axially by means of a retaining ring 35 in an annular groove 34 on the piston rod to prevent the piston rod from sliding down. In addition, it is advantageously mounted without play on piston rod 2.

The housing 1 is closed at the end opposite the seal 4 in such a fashion that the edge 37 of the housing is flanged and fastened in a gas-tight manner coaxially with a threaded pin 38, so that a closure element 39 of any form desired, such as an eye or an element in the shape of spherical segments, can be fastened by means of a corresponding threaded bushing 40. At the opposite free end of piston rod 2 a closure element 41 is fastened in a similar fashion. By providing spherical-segment-shaped closure elements 39, 41, it is ensured that no bending moments can be transmitted to the housing 1 or the piston rod 2, so that leakage of the seal 4 is prevented at this end as well, which might be caused by uneven radial stress.

The assembly and method of operation of the gas spring is as follows:

Beginning at the end of the piston rod 2 located in the internal chamber 8 of the housing, the guiding element 13 with snap ring 16 is first threaded onto the piston rod, followed by the lip seal 4 (not yet prestressed), then the fastening element 9 with the snap ring 11 and finally the shock absorber 36. The sliding piston 22, followed by the valve housing 23, is slid onto the piston rod 2, with the two parts being pushed until the sliding piston 22 is located at the transition from the expanded bore segment 26 to the narrowed bore segment 29 at the retaining ring 27. Then the retaining ring 35 is snapped into annular groove 34.

This pre-assembled unit is then inserted into the housing 1 from the outer end 19, so that snap ring 11 is pushed into the recess 10 in the retaining element 9 by the taper 19' so that it does not protrude beyond the outside circumference of the fastening element 9. When this snap ring 11 comes to the first annular groove 17, it snaps into it. Because of the tapered surface 18, however, the fastening element can be pushed further, since snap ring 11 is again compressed by the tapered surface 18. When it comes to the next annular groove 12, it snaps into it permanently. When the guide element 13, with simultaneous axial compression of lip seal 4, is slid sufficiently far into the housing that recess 15 and annular groove 17 line up, the snap ring 16 also snaps into this annular groove, so that the guide element is likewise protected permanently against axial sliding outwardly. The internal chamber 8 of the housing 1 is then filled in known fashion with compressed gas.

When the piston rod is pushed into the internal chamber 8 of the housing 1, the sliding piston 22, under the influence of the force of the gas and likewise the force of friction against internal wall 7 and outside surface 24 of the sliding piston, rises from valve housing 23 until its internal edge normally defining the base section 26 rests against the retaining ring 27. This allows gas to flow from the housing cavity 8b through the passage 33 and between the valve seat surfaces 31 and 32 through passages 30 and the expanded bore section 26 into the chamber 8a.

On the other hand, if the release of stress from piston rod 2 causes the latter to be pushed out of the housing 1, the sliding piston 22 with its valve seat 31 is pressed against valve seat surface 32 of valve body 23, so that passages 30 are closed and gas can only flow through damping bore 33. The gas spring therefore exerts a greater damping effort when the piston rod travels outwardly than when the piston rod is shoved into the housing.

Figure 3:
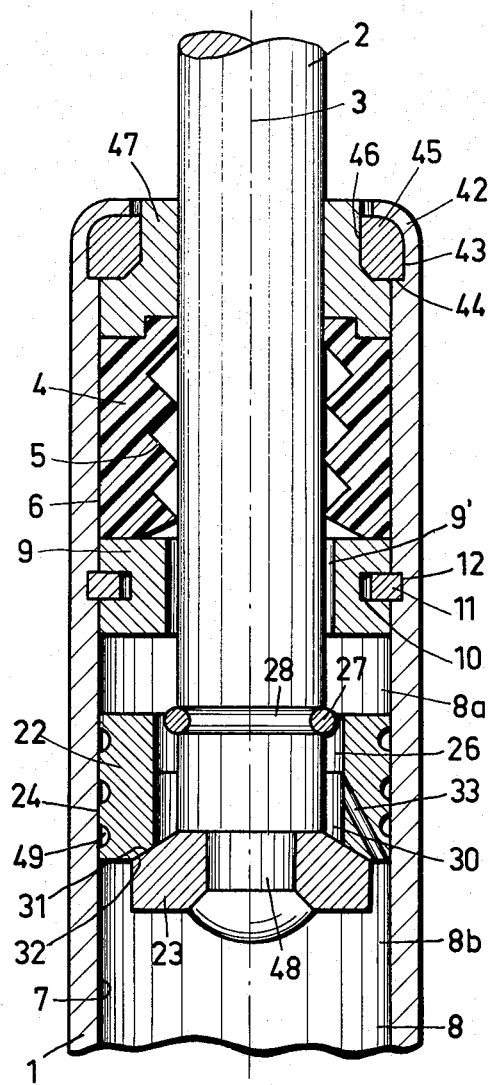
FIG. 3: an enlarged drawing of a sample embodiment modified in the seal area.

The gas spring according to FIG. 3, differs from the one shown in FIG. 1 primarily in that an annular groove 43 is provided on the outer housing edge 42, the groove 43 forming a stop 44 at its inner end for a rigid ring 45 made of steel or the like, the ring 45 fitting into a corresponding recess 46 of a guide element 47. Assembly is the same as for the embodiment shown in FIG. 1, the difference being that axial fastening of guide element 47 is accomplished by having the outer housing edge 42 flanged over the ring 45, but with the prestressing of the seal always being determined exactly by the distances between annular grooves 43 and 12. Since the flanging of housing edge 42 takes place against this rigid, stable steel ring 45, and since the part to be flanged is thinner than the rest of the housing 1, the body of the housing is not deformed.

In the embodiment according to FIG. 3, valve housing 23 is also riveted to a supporting shoulder 48, although such a construction could be used in either embodiment. Lubricating grooves 49 can be provided in either embodiment in the outer surface 24 of the sliding piston 22, so that the friction between sliding piston 22 and internal wall 7 of housing 1 can be reduced to a minimum.

It will be obvious to those skilled in the art that various changes may be made without departing from the scope of the invention and the invention is not to be considered limited to what is shown in the drawings and described in the specification.

What is claimed is:

1. In a gas spring comprising a housing made of a slender cylindrical tube; a piston rod mounted coaxially in said housing and protruding out of one end of said housing; a guide piston supported by said piston rod and positioned for axial movement in said housing; a multi-lip annular seal fastened axially in said housing at the end thereof from which said piston rod emerges, said seal resting against the piston rod, the internal end face of said seal having a fastening element and the outer end face having a guide element, the improvement wherein the internal wall of said housing is provided with two grooves at a preset distance, said gas spring further comprising a pair of rings each fitting into a corresponding annular recess in said guide element and in said fastening element, with at least the ring associated with said fastening element being a snap ring.

2. A gas spring according to claim 1, wherein the seal is made of a homogeneous material and presses against the internal wall of the housing.

3. A gas spring according to claim 1, wherein the groove associated with said guide element is tapered in the direction of the internal chamber of the housing.

4. A gas spring according to claim 1, wherein said housing is provided, at the end from which the piston rod emerges, with a taper in its internal wall which expands toward the edge of the housing.

5. A gas spring according to claim 1, wherein the ring associated with guide element is a snap ring.

6. A gas spring according to claim 1, wherein said guide element overlaps the end edge of said housing.

7. A gas spring according to claim 1, wherein the recess in said guide element and the corresponding groove extends to the end surface of housing, by the corresponding ring being rigid, and by the outside edge area of housing being flanged over this ring.

* * * * *